US012735565B2

(12) United States Patent
Komine et al.

(10) Patent No.: US 12,735,565 B2
(45) Date of Patent: Sep. 15, 2026

(54) OPTICAL FILM AND POLARIZING PLATE

(71) Applicant: TOSOH CORPORATION, Shunan (JP)

(72) Inventors: Takuya Komine, Yokkaichi (JP); Asuka Yoshimura, Yokkaichi (JP); Takahiro Kitagawa, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 279 days.

(21) Appl. No.: 18/710,380

(22) PCT Filed: Nov. 16, 2022

(86) PCT No.: PCT/JP2022/042519
§ 371 (c)(1),
(2) Date: May 15, 2024

(87) PCT Pub. No.: WO2023/090353
PCT Pub. Date: May 25, 2023

(65) Prior Publication Data

US 2025/0011590 A1 Jan. 9, 2025

(30) Foreign Application Priority Data

Nov. 18, 2021 (JP) ................................ 2021-187512

(51) Int. Cl.

| | |
|---|---|
| ***G02B 5/30*** | (2006.01) |
| ***C08K 5/01*** | (2006.01) |
| ***C08K 5/06*** | (2006.01) |
| ***C08K 5/18*** | (2006.01) |
| ***C08K 5/3437*** | (2006.01) |
| ***C08K 5/3492*** | (2006.01) |
| ***C08K 5/45*** | (2006.01) |
| ***C08L 67/02*** | (2006.01) |

(52) U.S. Cl.
CPC ................ *C08L 67/02* (2013.01); *C08K 5/01* (2013.01); *C08K 5/06* (2013.01); *C08K 5/18* (2013.01); *C08K 5/3437* (2013.01); *C08K 5/3492* (2013.01); *C08K 5/45* (2013.01); *G02B 5/3016* (2013.01); *C08L 2201/10* (2013.01); *C08L 2203/16* (2013.01)

(58) Field of Classification Search
CPC .. C08L 67/02; C08L 2201/10; C08L 2203/16; C08K 5/01; C08K 5/06; C08K 5/18; C08K 5/3437; C08K 5/3492; C08K 5/45; C08K 5/10; G02B 5/3016; G02B 1/08; G02B 5/30; G02B 5/3083; G02F 1/13363; G02F 1/133635; G02F 1/133637; G02F 1/133638
USPC ............ 359/489.01, 483.01, 489.02, 489.03, 359/489.07; 362/19; 353/20; 349/84, 349/117, 119, 120
See application file for complete search history.

(56) References Cited

U.S. PATENT DOCUMENTS

2008/0266493 A1* 10/2008 Yonezawa ............ G02B 5/3083 349/96

FOREIGN PATENT DOCUMENTS

| | | | |
|---|---|---|---|
| EP | 1 898 252 | A1 | 3/2008 |
| JP | 5-297223 | A | 11/1993 |
| JP | 5-323120 | A | 12/1993 |
| JP | 6-88909 | A | 3/1994 |
| JP | 2818983 | B2 | 10/1998 |
| JP | 2005-156862 | A | 6/2005 |
| JP | 2006-162748 | A | 6/2006 |
| JP | 2008-64817 | A | 3/2008 |
| JP | 2008-112141 | A | 5/2008 |

(Continued)

OTHER PUBLICATIONS

International Search Report issued Jan. 31, 2023 in PCT/JP2022/042519, filed on Nov. 16, 2022, 2 pages.

*Primary Examiner* — Arnel C Lavarias
(74) *Attorney, Agent, or Firm* — Oblon, McClelland, Maier & Neustadt, L.L.P.

(57) ABSTRACT

There has been a demand for an optical film having excellent glass-range photoelastic coefficient and a polarizing plate which uses this optical film. The present invention provides an optical film which is characterized by containing an ester-based resin that contains 50% by mole or more of a fumaric acid ester residue unit represented by formula (1) and having a negative birefringence, and a photoelasticity regulator having a positive birefringence, and which is also characterized in that the absolute value of the glass-range photoelastic coefficient thereof is $5\times10^{-12}$ $Pa^{-1}$ or less.

[Chem. 1]

(1)

(In the formula, each of $R_1$ and $R_2$ independently represents a linear alkyl group having 1 to 12 carbon atoms, a branched alkyl group having 3 to 12 carbon atoms, or a cyclic alkyl group having 3 to 6 carbon atoms.)

12 Claims, No Drawings

(56) References Cited

FOREIGN PATENT DOCUMENTS

| | | | | | |
|---|---|---|---|---|---|
| JP | 2009037110 | A | * | 2/2009 | |
| JP | 2011-107281 | A | | 6/2011 | |
| TW | 200821351 | A | * | 5/2008 | ......... G02F 1/13363 |

* cited by examiner

OPTICAL FILM AND POLARIZING PLATE

CROSS-REFERENCE TO RELATED APPLICATIONS

The present application is a 35 U.S.C. § 371 national stage patent application of International patent application PCT/JP2022/042519, filed on Nov. 16, 2022, which is based on and claims the benefits of priority to Japanese Application No. 2021-187512, filed on Nov. 18, 2021. The entire contents of all of the above applications are incorporated herein by reference.

TECHNICAL FIELD

The present disclosure relates to an optical film suitable for use in a retardation film or the like, and more particularly, to an optical film having an excellent glass-range photoelastic coefficient and a polarizing plate in which the optical film is disposed.

BACKGROUND ART

Liquid crystal displays are widely used in cellular phones, computer monitors, laptop computers, and televisions, as the most important display devices in the multimedia society. Many optical films are used in polarizing plates used in liquid crystal displays in order to improve display characteristics such as contrast improvement and color tone compensation when viewed from the front or from an oblique direction.

Typical examples of the polarizing plate-related optical film include retardation films. The retardation films are used as an antireflection layer for liquid crystal display devices, touch panels, or organic EL devices.

As a retardation film of prior art, polycarbonates or cyclic polyolefins are used, and all of these polymers are those having positive birefringence. Here, the positive and negative of birefringence are defined as follows.

The optical anisotropy of a polymer film molecularly oriented by stretching, casting by a coater, or the like can be represented by a refractive index ellipsoid in which the refractive index in a fast axis direction in the film plane is nx, a refractive index in the direction (slow axis) orthogonal to the fast axis in the film plane is ny, and a refractive index in the film thickness direction (vertical direction outside the film plane) is nz.

That is, in the uniaxial stretching of a polymer having a negative birefringence, a refractive index in the stretching axis direction is small (fast axis: stretching direction), and in the uniaxial stretching of a polymer having a positive birefringence, a refractive index in an axial direction orthogonal to the stretching axis direction is small (fast axis: orthogonal direction to the stretching direction).

In-plane retardation (Re) is expressed as a value obtained by multiplying the refractive index (ny) in the direction orthogonal to the fast axis direction minus the refractive index (nx) in the fast axis direction by the film thickness.

Many polymers have positive birefringence. Examples of the polymer having negative birefringence include an acrylic resin and polystyrene, but the acrylic resin exhibits a low retardation development, and the characteristics as the retardation film is insufficient. Polystyrene is not significantly used at present because of an issue in terms of optical characteristics such as a large wavelength dependency of retardation, a practical issue such as a low heat resistance, and an issue in terms of retardation stability such as a large photoelastic coefficient in a room temperature range, changing the retardation with a small stress.

There is a strong market demand for a retardation film exhibiting such negative birefringence. Various retardation films have been developed for the required characteristics.

A method of manufacturing a film having a refractive index in the thickness direction of the film increased by using a polymer having positive birefringence has been proposed. One is a treatment method in which a heat shrinkable film is adhered to one or both surfaces of a polymer film, and a laminate thereof is subjected to a heat stretching treatment to apply a shrinkage force in the thickness direction of the polymer film (for example, Patent Documents 1 to 3). Further, a method of uniaxially stretching a polymer film in the plane while applying an electric field to the polymer film has been proposed (for example, see Patent Document 4).

Also, a retardation film composed of fine particles having negative optical anisotropy and a transparent polymer has been proposed (for example, see Patent Document 5).

Further, Patent Documents 6 and 7 have been proposed as optical films having a high refractive index in the thickness direction.

CITATION LIST

Patent Document

Patent Document 1: Japanese Patent No. 2818983

Patent Document 2: Japanese Unexamined Patent Application, Publication No. H05-297223

Patent Document 3: Japanese Unexamined Patent Application, Publication No. H05-323120

Patent Document 4: Japanese Unexamined Patent Application, Publication No. H06-088909

Patent Document 5: Japanese Unexamined Patent Application, Publication No. 2005-156862

Patent Document 6: Japanese Unexamined Patent Application, Publication No. 2008-064817

Patent Document 7: Japanese Unexamined Patent Application, Publication No. 2011-107281

DISCLOSURE OF THE INVENTION

Problems to be Solved by the Invention

However, the methods proposed in Patent Documents 1 to 4 have an issue of poor productivity because of very complicated manufacturing process. Further, control of uniformity of the retardation or the like is significantly difficult compared to control by the conventional stretching.

The retardation film obtained by Patent Document 5 is a retardation film having negative birefringence by adding fine particles having negative optical anisotropy, and has issues such as uniform dispersibility of the fine particles, uniform orientation control, film transparency, or the like.

There is a need for an optical film exhibiting negative birefringence with high productivity and process adaptability.

In recent years, there has been a strong demand for a retardation film material to reduce the glass-range photoelastic coefficient in order to reduce retardation unevenness due to stress. However, Patent Documents 6 and 7 do not disclose or suggest reduction in the glass-range photoelastic coefficient.

Means for Solving the Problems

As a result of intensive investigations by the present inventors, the present inventors have found that an optical film including an ester-based resin with a specific property and a photoelasticity regulator with a specific property satisfies the above-mentioned issues, arriving at completion of the present disclosure.

That is, the present disclosure has the following gists.

(1) An optical film including an ester-based resin containing 50 mol % or more of a fumaric acid ester residue unit represented by the following formula (1) and exhibiting negative birefringence and a photoelasticity regulator exhibiting positive birefringence, the optical film having an absolute value of a glass-range photoelastic coefficient of $5\times10^{-12}$ $Pa^{-1}$ or less:

[Chem. 1]

(1)

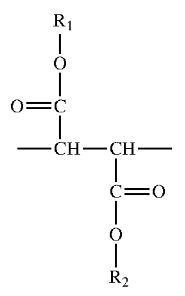

(in the formula, $R_1$ and $R_2$ each independently represent a linear alkyl group having 1 to 12 carbon atoms, a branched alkyl group having 3 to 12 carbon atoms, or a cyclic alkyl group having 3 to 6 carbon atoms).

(2) The optical film as described in (1), including 81 to 99.99% by weight of the ester-based resin and 0.01 to 19% by weight of the photoelasticity regulator.

(3) The optical film as described in (1) or (2), in which the photoelasticity regulator is an aromatic compound.

(4) The optical film as described in any one of (1) to (3), in which the photoelasticity regulator is at least one type selected from the group consisting of ultraviolet absorbents and liquid crystal materials.

(5) The optical film as described in any one of (1) to (4), in which the photoelasticity regulator is at least one selected from the group consisting of benzotriazole-based compounds, benzoimidazole-based compounds, benzophenone-based compounds, triazine-based compounds, benzoate-based compounds, biphenyl-based compounds, terphenyl-based compounds, naphthalene-based compounds, quinoxaline-based compounds, thiophene-based compounds, fluorene-based compounds, and carbazole-based compounds.

(6) The optical film as described in any one of (1) to (5), in which the photoelasticity regulator is at least one type selected from the group consisting of benzotriazole-based compounds, triazine-based compounds, biphenyl-based compounds, terphenyl-based compounds, naphthalene-based compounds having two or more naphthalene rings, thiophene-based compounds having two or more thiophene rings, fluorene-based compounds having a substituent containing at least one of 5-membered ring, 6-membered ring, and/or fused ring at one or more positions of 2-, 3-, 6-, 7-, and/or 9-position of the fluorene ring, and carbazole-based compounds having a substituent containing at least one of 5-membered ring, 6-membered ring, and/or fused ring at one or more positions of 2-, 3-, 6-, 7-, and/or 9-position of the carbazole ring.

(7) The optical film as described in any one of (1) to (6), in which the photoelasticity regulator has a solubility in a tetrahydrofuran solvent at 25° C. of 0.2 g/100 g or more.

(8) The optical film as described in any one of (1) to (7), in which the ester-based resin has a number average molecular weight of 100,000 to 5,000,000 in terms of standard polystyrene.

(9) The optical film as described in any one of (1) to (8), in which the optical film has a film thickness of 80 μm or less and an out-of-plane retardation (Rth) measured at a wavelength of 589 nm and represented by the following formula (a) of −700 to 0 nm:

$$Rth=[(nx+ny)/2-nz]\times d \qquad (a)$$

(in the formula, nx represents a refractive index in the fast axis direction in the film plane, ny represents a refractive index in the slow axis direction in the film plane, nz represents a refractive index in a vertical direction outside the film plane, and d represents a film thickness).

(10) The optical film as described in any one of (1) to (9), in which the optical film has a light transmittance of 85% or more and a haze of 1% or less.

(11) An optical film obtained by stretching the optical film as described in any one of (1) to (10), in which the optical film has a film thickness of 80 μm or less, an in-plane retardation Re measured at a wavelength of 589 nm and represented by the following formula (b) of 30 to 400 nm, and ratio (R450/R550) of an in-plane retardation Re (R450) measured at a wavelength of 450 nm and an in-plane retardation Re (R550) measured at a wavelength of 550 nm of less than 1.03:

$$\mathrm{Re}=(ny-nx)\times d \qquad (b)$$

(in the formula, nx represents a refractive index in the fast axis direction in the film plane, ny represents a refractive index in the slow axis direction in the film plane, and d represents a film thickness).

(12) A polarizing plate characterized by including the optical film as described in any one of (1) to (11) disposed on at least one side of a polarizer.

Effects of the Invention

According to the present disclosure, since the optical film of the present disclosure is a thin film including substantially a single component and has a low glass-range photoelastic coefficient, retardation unevenness due to stress is small, and the optical film is useful as an optical film for liquid crystal displays or an antireflection film. Further, by disposing the optical film of the present disclosure on at least one side of a polarizer, it is possible to obtain a polarizing plate having less retardation unevenness due to stress and excellent optical characteristics at the time of bending. The optical film of the present disclosure is useful as a polarizing plate for liquid crystal displays and a polarizing plate for antireflection.

PREFERRED MODE FOR CARRYING OUT THE INVENTION

Hereinafter, the optical film as one embodiment of the present disclosure (hereinafter, referred to as an "optical film of the present disclosure") will be described in detail.

The optical film of the present disclosure is an optical film including an ester-based resin containing 50 mol % or more of a fumaric acid ester residue unit represented by the following formula (1) and a photoelasticity regulator, in which the absolute value of the glass-range photoelastic coefficient is $5\times10^{-12}$ $Pa^{-1}$ or less:

[Chem. 2]

(1)

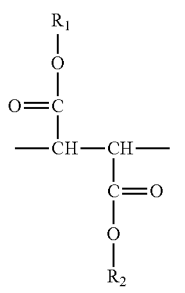

(in the formula, $R_1$ and $R_2$ each independently represent a linear alkyl group having 1 to 12 carbon atoms, a branched alkyl group having 3 to 12 carbon atoms, or a cyclic alkyl group having 3 to 6 carbon atoms).

The optical film of the present disclosure contains an ester-based resin exhibiting negative birefringence and a photoelasticity regulator exhibiting positive birefringence, thereby reducing the glass-range photoelastic coefficient. Here, the positive and negative of birefringence are defined as follows.

The negative birefringence means that a stress direction is in the fast axis direction, and the positive birefringence means that a direction perpendicular to the stress direction is in the fast axis direction.

That is, in response to application of stress in the uniaxial direction, a resin of which refractive index in an axial direction orthogonal to the stress direction decreases (fast axis: vertical direction of the stretching direction) is a resin exhibiting positive birefringence, and in response to uniaxial stretching, a resin of which refractive index in the stretching direction decreases (fast axis: stretching direction) is a resin exhibiting negative birefringence.

The optical film of the present disclosure includes a composition containing an ester-based resin having a negative birefringence and a photoelasticity regulator having a positive birefringence. The photoelasticity can be controlled by a combination of the negative birefringence of the ester-based resin constituting the composition and the positive birefringence of the photoelasticity regulator. The positive birefringence having a large refractive index in the stress direction can express birefringence, even by a low molecular weight compound such as an additive, and a large birefringence can be easily expressed. Thus, the effect can be exhibited by blending a small amount of a photoelasticity regulator.

Examples of the ester-based resin to be used as a raw material of the optical film include a fumaric acid ester-based resin containing 50 mol % or more, preferably 70 mol % or more, particularly preferably 80 mol % or more, and even more preferably 90 mol % or more of a fumaric acid ester residue unit represented by the formula (1), because an optical film having a low absolute value of the glass-range photoelastic coefficient is obtained.

In the formula (1), $R_1$ and $R_2$ each independently represent a linear alkyl group having 1 to 12 carbon atoms, a branched alkyl group having 3 to 12 carbon atoms, or a cyclic alkyl group having 3 to 6 carbon atoms. These alkyl groups may be substituted with a halogen group such as a fluorine atom and a chlorine atom; an ether group; an ester group, or an amino group.

Specific examples of $R_1$ and $R_2$ include an ethyl group, an isopropyl group, a s-butyl group, a t-butyl group, a s-pentyl group, a t-pentyl group, a s-hexyl group, a t-hexyl group, a cyclopropyl group, a cyclopentyl group, a cyclohexyl group, and the like. Among them, from the viewpoint of production of an optical film excellent in heat resistance and mechanical characteristics, $R_1$ and $R_2$ are preferably one type of the group consisting of an ethyl group, an isopropyl group, a s-butyl group, a t-butyl group, a cyclopentyl group, and a cyclohexyl group. An isopropyl group is more preferable, because an optical film having excellent balance of heat resistance and mechanical properties can be obtained.

Specific examples of the fumaric ester residue unit represented by the formula (1) include a diethyl fumarate residue, a diisopropyl fumarate residue, a di-s-butyl fumarate residue, a di-t-butyl fumarate residue, a di-s-pentyl fumarate residue, a di-t-pentyl fumarate residue, a di-s-hexyl fumarate residue, a di-t-hexyl fumarate residue, a dicyclopropyl fumarate residue, a dicyclopentyl fumarate residue, a dicyclohexyl fumalate residue, and the like. A diethyl fumalate residue, a diisopropyl fumarate residue, a di-s-butyl fumarate residue, a di-t-butyl fumarate residue, a dicyclopentyl fumarate residue, a dicyclohexyl fumarate residue, and the like are preferable, and a diisopropyl fumarate residue is particularly preferable. These may be used alone or in combination of two or more types thereof.

The ester-based resin may contain a residue unit other than the residue unit represented by the formula (1) and as the residue unit other than the residue unit represented by the formula (1), one type or two or more types of the following can be exemplified: a styrene residue such as a styrene residue and an α-methylstyrene residue; an acrylic acid residue; an acrylate ester residue such as a methyl acrylate residue, an ethyl acrylate residue, and a butyl acrylate residue; a methacrylic acid residue; a methacrylate ester residue such as a methyl methacrylate residue, an ethyl methacrylate residue, and a butyl methacrylate residue; a vinyl ester residue such as a vinyl acetate residue and a vinyl propionate residue; an acrylonitrile residue; a methacrylonitrile residue; an olefin residue such as an ethylene residue and a propylene residue; and the like.

As the ester-based resin provides particularly excellent mechanical properties, the number average molecular weight (Mn) thereof in terms of standard polystyrene obtained from an elution curve measured by gel permeation chromatography (GPC) is preferably 100,000 to 5,000,000, more preferably 100,000 to 1,000,000, and particularly preferably 120,000 to 300,000.

The ester-based resin may be manufactured by any method as long as the fumaric acid ester-based resin is obtained, and can be produced by radical polymerization.

As a method of radical polymerization, any of, for example, a bulk polymerization method, a solution polymerization method, a suspension polymerization method, a precipitation polymerization method, and an emulsion polymerization method can be adopted.

A proportion of the ester-based resin in the composition contained in the optical film of the present disclosure is preferably 81 to 99.99% by weight, more preferably 90 to 98% by weight, and particularly preferably 92 to 97% by weight from the viewpoints of improvement in mechanical properties and reduction in the glass-range photoelastic coefficient.

The photoelasticity regulator is an additive having positive birefringence. By adding a photoelasticity regulator having positive birefringence to the ester-based resin having negative birefringence, it is possible to cancel the birefringence and adjust and reduce the glass-range photoelastic coefficient. The larger the positive birefringence of the photoelasticity regulator, the lower the glass-range photoelastic coefficient, which is preferable.

The photoelasticity regulator is preferably an aromatic compound because it has a large positive birefringence and decreases glass-range photoelastic coefficient. The aromatic compound is an aromatic hydrocarbon or a compound having a heteroaromatic ring (heteroaromatic compound). Examples of the aromatic hydrocarbon include a compound having a 6-membered ring such as a benzene ring, or a fused ring such as an indene ring, a naphthalene ring, an anthracene ring, a phenanthrene ring, a fluorene ring, or a pyrene ring. The heteroaromatic compound is desirably a compound having atoms selected from the group consisting of a carbon atom, a nitrogen atom, an oxygen atom, and a sulfur atom, as ring-constituting atoms. Examples of the heteroaromatic compound include a 5-membered ring such as a pyrrole ring, a pyrazole ring, an imidazole ring, a triazole ring, a tetrazole ring, a furan ring, an oxazole ring, an isoxazole ring, an oxadiazole ring, a thiophene ring, a thiazole ring, an isothiazole ring, and a thiadiazole ring; a 6-membered ring such as a pyridine ring, a pyridazine ring, a pyrimidine ring, a pyrazine ring, a triazine ring, and a tetrazine ring; and a fused ring such as an indole ring, an isoindole ring, an indolidine ring, an indazole ring, a benzoimidazole ring, azaindole ring, imidazopyridine ring, benzotriazole ring, azaindazole ring, purine ring, benzofuran ring, isobenzofuran ring, benzothiophene ring, benzoxazole ring, benzoisoxazole ring, benzothiazole ring, benzoisothiazole ring, benzothiazole ring, quinoline ring, isoquinoline ring, naphthyridine ring, quinazoline ring, quinoxaline ring, cinnoline ring, pteridine ring, coumarin ring, benzooxazine ring, carbazole ring, a dibenzofuran ring, an acridine ring, a phenazine ring, and a phenanthroline ring. These aromatic hydrocarbon rings and heteroaromatic rings may have a substituent. Examples of the substituent include a hydrogen atom, an alkyl group having 1 to 12 carbon atoms, an alkoxy group having 1 to 6 carbon atoms, a halogen atom, a hydroxy group, a carboxy group, a nitro group, and a cyano group. The alkyl group may be substituted with a halogen group such as a fluorine atom or a chlorine atom; an ether group; an ester group or an amino group.

The photoelasticity regulator is preferably a compound having at least one type selected from the group consisting of a benzene ring, an indene ring, a naphthalene ring, a fluorene ring, a thiophene ring, a triazine ring, a benzotriazole ring, and a carbazole ring from the viewpoints of improvement in mechanical properties, compatibility with a resin, and reduction in glass-range photoelastic coefficient.

The photoelasticity regulator is preferably a compound having at least two of 5-membered ring, 6-membered ring, and/or fused ring, and more preferably a compound having at least three of 5-membered ring, 6-membered ring, and/or fused ring, because such a photoelasticity regulator is easy to stress-orient and has large positive birefringence. In particular, a compound in which at least two of 5-membered ring, 6-membered ring, and/or fused ring are continuously bonded is preferable and a compound in which three or more of 5-membered ring, 6-membered ring, and/or fused ring are continuously bonded is particularly preferable, because such a compound is easy to stress-orient and has large positive birefringence.

The photoelasticity regulator is preferably at least one type selected from the group consisting of ultraviolet absorbents and liquid crystal materials because such a photoelasticity regulator is easy to stress orient and has large positive birefringence.

Preferable examples of the ultraviolet absorbents include a benzotriazole-based compound, a benzophenone-based compound, a triazine-based compound, and a benzoate-based compound. As the ultraviolet absorbents, at least one of benzotriazole-based compounds and/or triazine-based compounds is preferable, because such a compound has particularly large positive birefringence and considerably reduces the glass-range photoelastic coefficient. A triazine compound is particularly preferred.

As a preferable example of the liquid crystal materials, a nematic liquid crystal is exemplified because such a liquid crystal material is easy to stress orient and has large positive birefringence. Preferable examples of the nematic liquid crystal include biphenyl compounds and terphenyl compounds. The liquid crystal material is preferably at least one of cyanobiphenyl compounds and/or cyanoterphenyl compounds because such a compound has particularly large positive birefringence and reduces the glass-range photoelastic coefficient.

The photoelasticity regulator is preferably at least one selected from the group consisting of benzotriazole-based compounds, benzoimidazole-based compounds, benzophenone-based compounds, triazine-based compounds, benzoate-based compounds, biphenyl-based compounds, terphenyl-based compounds, naphthalene-based compounds, quinoxaline-based compounds, thiophene-based compounds, fluorene-based compounds, and carbazole-based compounds. The naphthalene-based compounds are preferably a compound having two or more naphthalene rings, because such a compound is easy to stress orient and has a large positive birefringence. The thiophene-based compounds are preferably a compound having two or more thiophene rings, and particularly preferably a compound having three or more thiophene rings, because such a compound is easy to stress orient and has a large positive birefringence. The fluorene-based compounds and the carbazole-based compounds are preferably a compound having a substituent containing at least one of 5-membered ring, 6-membered ring, and/or fused ring at one or more positions of 2-, 3-, 6-, 7-, and/or 9-position of the fluorene ring or the carbazole ring, more preferably a compound having a substituent containing at least one of 5-membered ring, 6-membered ring, and/or fused ring at one or more positions of 2-, 3-, 6-, and/or 7-position of the fluorene ring or the carbazole ring, and particularly preferably a compound having a substituent containing at least one of 5-membered ring, 6-membered ring, and/or fused ring at one or more positions of 2- and/or 7-position of the fluorene ring or the carbazole ring.

The photoelasticity regulator preferably has a molecular weight of 150 to 5,000, more preferably 250 to 2,000, and particularly preferably 280 to 1,000, from the viewpoints of compatibility with a resin and reduction in the glass-range photoelastic coefficient. The term "molecular weight" as used herein refers to a molecular weight when the photoelasticity regulator is a low molecular weight compound which can be calculated from a chemical structure, and refers to a weight average molecular weight in terms of standard polystyrene when the photoelasticity regulator is a high molecular weight compound having a repeating unit.

From the viewpoint of compatibility with a resin, the solubility of the photoelasticity regulator in a tetrahydrofuran solvent at 25° C. is preferably 0.2 g/100 g or more, more preferably 0.2 g/100 g or more and 2,000 g/100 g or less, still more preferably 0.2 g/100 g or more and 500 g/100 g or less, and particularly preferably 0.2 g/100 g and more and 300 g/100 g or less. The photoelasticity regulator having high solubility in a tetrahydrofuran solvent is highly compatible with a resin, and a film having excellent transparency can be obtained.

A proportion of the photoelasticity regulator in the composition included in the optical film of the present disclosure is preferably 0.01 to 19% by weight, more preferably 2 to 10% by weight, and particularly preferably 3 to 8% by weight from the viewpoints of improvement in mechanical properties, compatibility with a resin, and reduction in glass-range photoelastic coefficient.

Examples of the photoelasticity regulator to be used in the present disclosure include: bezotriazole-based compounds such as 2-(2'-hydroxy-5'-methylphenyl)benzotriazole, 2-(2'-hydroxy-5'-t-butylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2H-benzotriazol-2-yl)-6-(1-methyl-1-phenylethyl)-4-(1,1,3,3-tetramethylbutyl)phenol, 2,2'-methylenebis[6-(benzotriazol-2-yl)-4-t-octylphenol], 2-(2H-benzotriazol-2-yl)-4,6-bis(1-methyl-1-phenylethyl)phenol, and 2-[2-hydroxy-3-(4,5,6,7-tetrahydro-1,3-dioxo-1H-isoindol-2-ylmethyl)-5-methylphenyl]-2H-benzotriazole; benzimidazole-based compounds such as 2-phenylbenzimidazole, and 1,7'-dimethyl-2'-propyl-2,5'-bibenzimidazole; benzophenone-based compounds such as 2-hydroxy-4-methoxybenzophenone, 2,2'-dihydroxy-4-methoxybenzophenone, 2,2'-dihydroxy-4,4'-methoxybenzophenone, 2,4-dihydroxybenzophenone, 2,2',4,4'-tetrahydroxybenzophenone, and 2-hydroxy-4-methoxy-5-sulfobenzophenone; triazine-based compounds such as 2,4,6-tri(4-pyridyl)-1,3,5-triazine, 2,4,6-triphenyl-1,3,5-triazine, 2,4-diphenyl-6-(2,4-dihydroxyphenyl)-1,3,5-triazine, 2,4-diphenyl-6-(4-fluorophenyl)-1,3,5-triazine, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-bis(2,4-dimethylphenyl)-6-(2,4-dihydroxyphenyl)-1,3,5-triazine, 2,4-bis(2,4-dimethylphenyl)-6-(2-hydroxy-4-methoxyphenyl)-1,3,5-triazine, 2,4-bis(2,4-dimethylphenyl)-6-(2-hydroxy-4-ethoxyphenyl)-1,3,5-triazine, 2,4-bis(2,4-dimethylphenyl)-6-(2-hydroxy-4-propoxyphenyl)-1,3,5-triazine, 2,4-bis(2,4-dimethylphenyl)-6-(2-hydroxy-4-butoxyphenyl)-1,3,5-triazine, 2,4-bis(2,4-dimethylphenyl)-6-(2-hydroxy-4-hexyloxyphenyl)-1,3,5-triazine, 2,6-diphenyl-4-(2-hydroxy-4-hexyloxyphenyl)-1,3,5-triazine, 2,4-bis(2,4-dimethylphenyl)-6-(2-hydroxy-4-n-octyloxyphenyl)-1,3,5-triazine, 2-[4-[(2-hydroxy-3-(2'-ethyl)hexyl)oxy]-2-hydroxyphenyl]-4,6-diphenyl-1,3,5-triazine, 2,4-bis(2,4-dimethylphenyl)-6-(2-hydroxy-4-[2-(2-ethylhexanoyloxy)ethoxy]phenyl)-1,3,5-triazine, and 2-[4-[(2-hydroxy-3-(2'-ethyl)hexyl)oxy]-2-hydroxyphenyl]-4,6-bis(2,4-dimethylphenyl)-1,3,5-triazine; benzoate-based compounds such as 2,4-di-t-butylphenyl-3,5-di-t-butyl-4-hydroxybenzoate, 2,4-di-t-pentylphenyl-3,5-di-t-butyl-4-hydroxybenzoate, and hexadecyl-3,5-di-t-butyl-4-hydroxybenzoate; biphenyl-based compounds such as 4-cyano-4'-methylbiphenyl, 4-cyano-4'-ethylbiphenyl, 4-cyano-4'-propylbiphenyl, 4-cyano-4'-butylbiphenyl, 4-cyano-4'-pentylbiphenyl, 4-cyano-4'-hexylbiphenyl, 4-cyano-4'-heptylbiphenyl, 4-cyano-4'-n-octylbiphenyl, 4-cyano-4'-nonylbiphenyl, 4-cyano-4'-decylbiphenyl, 4-cyano-4'-undecylbiphenyl, 4-cyano-4'-dodecylbiphenyl, 4-cyano-4'-methoxybiphenyl, 4-cyano-4'-ethoxybiphenyl, 4-cyano-4'-propoxybiphenyl, 4-cyano-4'-butoxybiphenyl, 4-cyano-4'-pentyloxybiphenyl, 4-cyano-4'-hexyloxybiphenyl, 4-cyano-4'-heptyloxybiphenyl, 4-cyano-4'-n-octyloxybiphenyl, 4-cyano-4'-nonyloxybiphenyl, 4-cyano-4'-decyloxybiphenyl, 4-cyano-4'-undecyloxybiphenyl, 4-cyano-4'-dodecyloxybiphenyl, and 4-4'-bis(trans-4-propylcyclohexyl)biphenyl, trans-4-cyano-4'-(4-pentylcyclohexyl)biphenyl; terphenyl-based compounds such as 4-cyano-4"-methyl-p-terphenyl, 4-cyano-4"-ethyl-p-terphenyl, 4-cyano-4"-propyl-p-terphenyl, 4-cyano-4"-butyl-p-terphenyl, 4-cyano-4"-pentyl-p-terphenyl, 4-cyano-4"-hexyl-p-terphenyl, 4-cyano-4"-heptyl-p-terphenyl, 4-cyano-4"-n-octyl-p-terphenyl, 4-cyano-4"-nonyl-p-terphenyl, 4-cyano-4"-decyl-p-terphenyl, 4-cyano-4"-undecyl-p-terphenyl, 4-cyano-4"-dodecyl-p-terphenyl, 4-cyano-4"-methoxy-p-terphenyl, 4-cyano-4"-ethoxy-p-terphenyl, 4-cyano-4"-propoxy-p-terphenyl, 4-cyano-4"-butoxy-p-terphenyl, 4-cyano-4"-pentyloxy-p-terphenyl, 4-cyano-4"-hexyloxy-p-terphenyl, 4-cyano-4"-heptyloxy-p-terphenyl, 4-cyano-4"-n-octyloxy-p-terphenyl, 4-cyano-4"-nonyloxy-p-terphenyl, 4-cyano-4"-decyloxy-p-terphenyl, 4-cyano-4"-undecyloxy-p-terphenyl, 4-cyano-4"-dodecyloxy-p-terphenyl, 4-amino-p-terphenyl, 4,4"-di-amino-p-terphenyl, 4-nitro-p-terphenyl, 4,4"-dinitro-p-terphenyl, 4"-ethyl-2'-fluoro-4-propyl-p-terphenyl, 2'-fluoro-4-pentyl-4"-propyl-p-terphenyl, 2',3,4-trifluoro-4"-propyl-p-terphenyl, 2',3,4,5-tetrafluoro-4"-propyl-p-terphenyl, and 4,4"-dimethyl-5'-(p-tolyl)-1,1':3',1"-terphenyl; naphthalene-based compounds such as 1,1'-binaphthyl, 2,2'-dimethyl-1,1'-binaphthyl, 2,2'-dimethoxy-1,1'-binaphthyl, 2,5-di(1-naphthyl)-1,3,4-oxadiazole, and dinaphtho[2,1-b:1',2'-d]furan; quinoxaline-based compounds such as 2,3-diphenylquinoxaline and 6H-indolo[2,3-b]quinoxaline; thiophene-based compounds such as 4-phenyldibenzothiophene, 2,3,4,5-tetraphenylthiophene, 4,7-di(2-thienyl)-2,1,3-benzothiadiazole, 4,7-bis(5-bromo-2-thienyl)-2,1,3-benzothiadiazole, 4,7-bis(5-n-octyl-2-thienyl)-2,1,3-benzothiadiazole, 1,3,5-tri(2-thienyl)benzene, tris[4-(2-thienyl)phenyl]amine, and 2,5-di(2-thienyl)thieno[3,2-b]thiophene; fluorene-based compounds such as 2,3-benzofluorene, 9,9'-bifluorene, 3,6-diphenylfluorene, 9-(9,9-dimethylfluorene-2-yl)-9H-carbazole, 2,7-bis(9H-carbazol-9-yl)-9,9-dimethylfluorene, bis(9,9-dimethyl-9H-fluorene-2-yl)amine, 2-(4-biphenylyl)amino-9,9-dimethylfluorene, 2-(3-biphenylyl)amino-9,9-dimethylfluorene, 2-[(naphthalene-1-yl)amino]-9,9-diphenyl-9H-fluorene, 9,9-dimethyl-N-(2-naphthyl)-9H-fluorene-2-amine, N-(3,5-diphenylphenyl)-9,9-dimethylfluorene-2-amine, 2-chloro-4,6-bis(9,9-dimethyl-9H-fluoren-2-yl)-1,3,5-triazine, and N-([1,1'-biphenyl]-4-yl)-N-(4'-bromo-[1,1'-biphenyl]-4-yl)-9,9-dimethylfluorene-2-amine; and carbazole-based compounds such as 4-phenyl-9H-carbazole, 9-phenylcarbazole, 9-(1-naphthyl)carbazole, 9-(4-biphenylyl)carbazole, 1,3-di-9-carbazolylbenzene, 5-phenyl-5,12-dihydroindolo[3,2-a]carbazole, 2,8-bis(9H-carbazol-9-yl)dibenzothiophene, 4,4',4'"-tri-9-carbazolyltriphenylamine, 4,4'-bis(9H-carbazol-9-yl)biphenyl, 4,4'-bis(9H-carbazol-9-yl)-2,2'- dimethylbiphenyl, 4,4'-bis(3,6-di-tert-butyl-9H-carbazol-9-yl)-1,1'-biphenyl, 3,3'-bicarbazole, 3,6-diphenylcarbazole, 3-[4-(4-biphenylylamino)phenyl]-9-phenylcarbazole, 9-phenyl-9H,9'H-3,3'-bicarbazole, 9,9'-diethyl-9H,9'H-3,3'-bicarbazole, 9,3':6',9"-tercarbazole, 9,9'-diphenyl-9H,9'H-3,3'-bicarbazole, 9,9"-diphenyl-9H,9'H,9"H-3,3':6',3"-tercarbazole, 9-phenyl-9H,9'H-2,3'-bicarbazole, and 2,7-diphenyl-9H-carbazole.

The thiophene-based compounds are preferably a compound having two or more thiophene rings, because such compounds are easy to stress-orient and have a large positive birefringence, and examples thereof include thiophene-based compounds such as 4,7-di(2-thienyl)-2,1,3-benzothiadiazole, 4,7-bis(5-bromo-2-thienyl)-2,1,3-benzothiadiazole, 4,7-bis(5-n-octyl-2-thienyl)-2,1,3-benzothiadiazole, 1,3,5-tri(2-thienyl)benzene, tris[4-(2-thienyl)phenyl]amine, and 2,5-di(2-thienyl)thieno[3,2-b]thiophene. Compounds having three or more thiophene rings are particularly preferred, and thiophene-based compounds such as 1,3,5-tri(2-thienyl)benzene, tris[4-(2-thienyl)phenyl]amine, and 2,5-di(2-thienyl)thieno[3,2-b]thiophene may be exemplified.

The fluorene-based compound, compounds having a substituent containing at least one of 5-membered ring, 6-membered ring, and/or fused ring at one or more positions of 2-, 3-, 6-, 7-, and/or 9-position of the fluorene ring are preferable, because such fluorene-based compounds are easy to stress-orient and have large positive birefringence. Examples thereof include fluorene-based compounds, such as 9,9'-bifluorene, 3,6-diphenylfluorene, 9-(9,9-dimethylfluorene-2-yl)-9H-carbazole, 2,7-bis(9H-carbazol-9-yl)-9,9-dimethylfluorene, bis(9,9-dimethyl-9H-fluorene-2-yl)amine, 2-(4-biphenylyl)amino-9,9-dimethylfluorene, 2-(3-biphenylyl)amino-9,9-dimethylfluorene, 2-[(naphthalene-1-yl)amino]-9,9-diphenyl-9H-fluorene, 9,9-dimethyl-N-(2-naphthyl)-9H-fluoren-2-amine, N-(3,5-diphenylphenyl)-9,9-dimethylfluoren-2-amine, 2-chloro-4,6-bis(9,9-dimethyl-9H-fluoren-2-yl)-1,3,5-triazine, and N-([1,1'-biphenyl]-4-yl)-N-(4'-bromo-[1,1'-biphenyl]-4-yl)-9,9-dimethylfluoren-2-amine.

Compounds having a substituent containing at least one of 5-membered ring, 6-membered ring, and/or fused ring at one or more positions of 2-, 3-, 6-, and/or 7-position of the fluorene ring are more preferable and examples thereof include fluorene-based compounds, such as 3,6-diphenylfluorene, 9-(9,9-dimethylfluoren-2-yl)-9H-carbazole, 2,7-bis(9H-carbazol-9-yl)-9,9-dimethylfluorene, bis(9,9-dimethyl-9H-fluoren-2-yl)amine, 2-(4-biphenylyl)amino-9,9-dimethylfluorene, 2-(3-biphenylyl)amino-9,9-dimethylfluorene, 2-[(naphthalen-1-yl)amino]-9,9-diphenyl-9H-fluorene, 9,9-dimethyl-N-(2-naphthyl)-9H-fluoren-2-amine, N-(3,5-diphenylphenyl)-9,9-dimethylfluoren-2-amine, 2-chloro-4,6-bis(9,9-dimethyl-9H-fluoren-2-yl)-1,3,5-triazine, and N-([1,1'-biphenyl]-4-yl)-N-(4'-bromo-[1,1'-biphenyl]-4-yl)-9,9-dimethylfluoren-2-amine.

In particular, compounds having a substituent containing at least one of 5-membered ring, 6-membered ring, and/or fused ring at one or more positions of 2- and/or 7-position of the fluorene ring are preferable and examples thereof include fluorene-based compounds, such as 9-(9,9-dimethylfluoren-2-yl)-9H-carbazole, 2,7-bis(9H-carbazol-9-yl)-9,9-dimethylfluorene, bis(9,9-dimethyl-9H-fluoren-2-yl)amine, 2-(4-biphenylyl)amino-9,9-dimethylfluorene, 2-(3-biphenylyl)amino-9,9-dimethylfluorene, 2-[(naphthalen-1-yl)amino]-9,9-diphenyl-9H-fluorene, 9,9-dimethyl-N-(2-naphthyl)-9H-fluoren-2-amine, N-(3,5-diphenylphenyl)-9,9-dimethylfluoren-2-amine, 2-chloro-4,6-bis(9,9-dimethyl-9H-fluoren-2-yl)-1,3,5-triazine, N-([1,1'-biphenyl]-4-yl)-N-(4'-bromo-[1,1'-biphenyl]-4-yl)-9,9-dimethylfluoren-2-amine.

The carbazole-based compound, compounds having a substituent containing at least one of 5-membered ring, 6-membered ring, and/or fused ring at one or more positions of 2-, 3-, 6-, 7-, and/or 9-position of the carbazole ring are preferable, because such carbazole-based compounds are easy to stress-orient and have large positive birefringence. Examples thereof include carbazole-based compounds, such as 4-phenyl-9H-carbazol, 9-phenylcarbazol, 9-(1-naphthyl)carbazol, 9-(4-biphenylyl)carbazol, 1,3-di-9-carbazolylbenzene, 5-phenyl-5,12-dihydroindolo[3,2-a]carbazole, 2,8-bis(9H-carbazol-9-yl)dibenzothiophene, 4,4',4'"-tri-9-carbazolyltriphenylamine, 4,4'-bis(9H-carbazole-9-yl)biphenyl, 4,4'-bis(9H-carbazol-9-yl)-2,2'-dimethylbiphenyl, 4,4'-bis(3,6-di-tert-butyl-9H-carbazol-9-yl)-1,1'-biphenyl, 3,3'-bicarbazole, 3,6-diphenylcarbazole, 3-[4-(4-biphenylylamino)phenyl]-9-phenylcarbazole, 9-phenyl-9H,9'H-3,3'-bicarbazole, 9,9'-diethyl-9H,9'H-3,3'-bicarbazole, 9,3':6',9"-tercarbazole, 9,9'-diphenyl-9H,9'H-3,3'-bicarbazole, 9,9"-diphenyl-9H,9'H,9"H-3,3':6',3"-tercarbazole, 9-phenyl-9H,9'H-2,3'-bicarbazole, and 2,7-diphenyl-9H-carbazole.

Furthermore, compounds having a substituent containing at least one of 5-membered ring, 6-membered ring, and/or fused ring at one or more positions of 2-, 3-, 6-, and/or 7-position of the carbazole ring are more preferable. Examples thereof include carbazole-based compounds, such as 3,3'-bicarbazole, 3,6-diphenylcarbazole, 3-[4-(4-biphenylylamino)phenyl]-9-phenylcarbazole, 9-phenyl-9H,9'H-3,3'-bicarbazole, 9,9'-diethyl-9H,9'H-3,3'-bicarbazole, 9,3':6',9"-tercarbazole, 9,9'-diphenyl-9H,9'H-3,3'-bicarbazole, 9,9"-diphenyl-9H,9'H,9"H-3,3':6',3"-terbazole, 9-phenyl-9H,9'H-2,3'-bicarbazole, and 2,7-diphenyl-9H-carbazole.

Further, compounds having a substituent containing at least one of 5-membered ring, 6-membered ring, and/or fused ring at one or more positions of 2- and/or 7-position of the carbazole ring are particularly preferable and examples thereof include carbazole-based compounds such as 9-phenyl-9H, 9'H-2,3'-bicarbazole and 2,7-diphenyl-9H-carbazole.

The optical film of the present disclosure has an absolute value of the glass-range photoelastic coefficient of $5\times10^{-12}$ $Pa^{-1}$ or less, preferably $0.01\times10^{-12}$ to $5\times10^{-12}$ $Pa^{-1}$, more preferably $0.01\times10^{-12}$ to $4\times10^{-12}$ $Pa^{-1}$, even more preferably $0.01\times10^{-12}$ to $3\times10^{-12}$ $Pa^{-1}$, and particularly preferably $0.01\times10^{-12}$ to $1\times10^{-12}$ $Pa^{-1}$, because such optical film has small stress birefringence, which is generated by a change in environmental temperatures or the like during expansion and contraction and unevenness of retardation is less likely to occur. In the present specification, the glass-range photoelastic coefficient of the optical film is a value measured by, for example, a measurement method described in Examples described below.

In the optical film of the present disclosure, the out-of-plane retardation (Rth) measured at a wavelength of 589 nm and represented by the following formula (a) is preferably −700 to 0 nm, more preferably −240 to −20 nm, and particularly preferably −160 to −60 nm, because such an optical film has excellent viewing angle characteristics. In the present specification, the out-of-plane retardation of the optical film is, for example, a value measured by a measurement method described in the Examples described below.

$$Rth = [(nx + ny)/2 - nz] \times d \quad (a)$$

(in the formula, nx represents a refractive index in the fast axis direction in the film plane, ny represents a refractive index in the slow axis direction in the film plane, nz represents a refractive index in a vertical direction outside the film plane, and d represents a film thickness).

In the optical film, the thickness is preferably 80.0 μm or less, more preferably 0.1 to 50.0 μm, and particularly preferably 0.1 to 35.0 μm from the viewpoint of adaptability of the optical member to thinner film.

The optical film preferably has a light transmittance of 85% or more, more preferably 90% or more, and particularly preferably 92% to 95% in order to avoid a decrease in the amount of light of the image display device. Here, the light transmittance represents the total light transmittance and is a value measured at a wavelength of 380 to 780 nm using a transmittance-measurable device equipped with a white light source according to JIS K 7361-1 (1997).

The haze of the optical film is preferably 1.0% or less and more preferably 0.8% or less. By controlling the haze to be within the above range, a high contrast image can be obtained when being incorporated in a display device as an optical film. The haze is a value measured at a wavelength of 380 to 780 nm using a general haze meter equipped with a white light source in accordance with JIS-K 7136 (2000).

The optical film may contain an antioxidant to improve thermal stability. Examples of the antioxidant include hindered phenol-based antioxidants, phosphorus-based antioxidants, sulfur-based antioxidants, lactone-based antioxidants, amine-based antioxidants, hydroxyamine-based antioxidants, vitamin E-based antioxidants, and other antioxidants. These may be used alone or as a combination of two or more types.

The optical film may contain a hindered amine-based light stabilizer or an ultraviolet absorbent in order to enhance weatherability. Examples of the ultraviolet absorbent include benzotriazole, benzophenone, triazine, benzoate, or the like.

The optical film may contain other polymers, surfactants, polymer electrolytes, conductive complexes, pigments, dyes, antistatic agents, anti-blocking agents, lubricants and the like without departing from the gist of the invention.

The method for producing the optical film is not particularly limited, and the optical film can be produced by, for example, forming a long film by a method such as a solution casting method using a resin as a raw material.

Here, the solution casting method is a method in which a resin solution (generally referred to as a dope) is cast on a support substrate and then heated and dried to evaporate the solvent, followed by peeling of the substrate to obtain a film.

The solvent used in the resin solution in the solution casting method may be any solvent as long as it can dissolve the resin or the like, and the boiling point of the solvent is preferably 200° C. or lower and more preferably 170° C. or lower so that the residual solvent hardly remains when the film is obtained.

As the solvent, the following solvents may be mentioned, for example, and these may be used singularly or as a mixed solvent thereof: halogenated hydrocarbons such as chloroform, dichloromethane, carbon tetrachloride, dichloroethane, tetrachloroethane, trichloroethylene, tetrachloroethylene, chlorobenzene, and dichlorobenzene; phenols such as phenol and chlorophenol; aromatic hydrocarbons such as benzene, toluene, xylene, methoxybenzene, mesitylene, and dimethoxybenzene; ketone-based solvents such as acetone, methyl ethyl ketone, methyl isobutyl ketone, cyclohexanone, cyclopentanone, 2-pyrrolidone, and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether and tetrahydrofuran; carbon disulfide, ethyl cellosolve, and butyl cellosolve.

The viscosity of the resin solution can be adjusted by adjusting the molecular weight, concentration, and solvent type of each component. The viscosity of the resin solution is not particularly limited, but is preferably 100 to 30,000 cps, more preferably 300 to 20,000 cps, and particularly preferably 300 to 15,000 cps in order to facilitate film casting.

In the present disclosure, the concentration of the raw material resin with respect to the dope is not particularly limited as long as dissolution and film formation are possible. The dissolution may be carried out to obtain a predetermined concentration in a dissolution stage, or a low concentration solution may be prepared in advance and then adjusted to a predetermined high concentration solution in a concentration step. Further, a resin solution with a high concentration may be prepared in advance and thereafter various additives are added to the resin solution to obtain a resin solution having a predetermined low concentration.

The support substrates to be used are not particularly limited, and examples thereof include polymer substrates including: polyesters such as polyethylene terephthalate and polyethylene naphthalate, polycarbonates, polystyrenes, polyethylene, polypropylene, polyacryl, polyvinyl chloride and polyvinylidene chloride, celluloses such as cellulose acetate and cellulose ether, polyvinyl alcohol, polyamides, polyimides, polyarylates, polysulfones, polyethersulfones, polyetherketones, phenol resins, epoxy-based resins, alicyclic polyolefins, and norbornene-based thermoplastic transparent resins; glass substrates such as glass plates and quartz substrates; metal substrates such as aluminum, stainless steel, and ferrotype; and inorganic substrates such as ceramic substrates. The substrate is preferably a polymer substrate including polyesters such as polyethylene terephthalate or polyethylene naphthalate, polypropylene, polyacryl, celluloses such as cellulose acetate or cellulose ether, polyimides, alicyclic polyolefins, or norbornene-based thermoplastic transparent resins. Particularly preferred are polymer substrates including polyesters such as polyethylene terephthalate and polyethylene naphthalate, polypropylene, polyimides, alicyclic polyolefins, and norbornene-based thermoplastic transparent resins.

The casting method is not particularly limited, and a conventional method can be adopted. Examples thereof include a T-die method, a doctor blade method, a bar coater method, a slot die method, a lip coater method, a reverse gravure coating method, a micro gravure method, a spin coating method, a brush coating method, a roll coating method, and a flexographic printing method.

The drying method in the drying step is not particularly limited, and ordinary heating means can be adopted.

Examples of the heater include a hot air blower, a heating roll, and a far infrared heater. The drying temperature is preferably from 30 to 200° C., particularly preferably from 40 to 160° C. It should be noted that drying may be under the condition that the drying temperature is set at one stage or may be multi-stage drying in which drying is performed at a low temperature in the first stage and then at a high temperature in the second stage or later in order to maintain the appearance and shorten the drying time.

The peeling speed of the film in a substrate peeling step is preferably in the range of 0.1 to 30 m/min, more preferably in the range of 1 to 30 m/min from the viewpoints of productivity, mechanical accuracy, stability, and the like.

The optical films of the present disclosure can also be formed into stretched optical films. The retardation can be controlled by stretching the optical film of the present disclosure.

In the stretched optical film, the in-plane retardation (Re) measured at 589 nm and represented by the following formula (b) is 30 to 400 nm, preferably 40 to 250 nm, and particularly preferably 60 to 230 nm, because such an optical film has excellent viewing angle characteristics such as low black luminance and high contrast. In the present specification, the in-plane retardation of the optical film is, for example, a value measured by a measurement method in the Examples described below.

$$Re=(ny-nx)\times d \quad (b)$$

(in the formula, nx represents a refractive index in the fast axis direction in the film plane, ny represents a refractive index in the slow axis direction in the film plane, and d represents the film thickness.)

In the stretched optical film, the ratio (R450/R550) of Re (R450) measured at a wavelength of 450 nm to Re (R550) measured at a wavelength of 550 nm is less than 1.03, preferably 1.02 or less, more preferably 0.70 to 1.00, still more preferably 0.80 to 0.96, and particularly preferably 0.80 to 0.90, because such an optical film has excellent viewing angle characteristics. In the present specification, the ratio (R450/R550) of the optical film is a value measured by, for example, a measurement method described in the Examples below.

In the stretched optical film, the thickness is 80.0 μm or less, more preferably 0.1 to 50.0 μm, and particularly preferably 0.1 to 25.0 μm from the viewpoint of adaptability of the optical member to thinner film.

As the stretching method, for example, a uniaxial stretching method or a biaxial stretching method can be mentioned because retardation control is possible. Examples of the uniaxial stretching method include a longitudinal uniaxial stretching method in which stretching is performed between rolls and a transverse positional stretching method in which stretching is performed using a tenter. Examples of the biaxial stretching method include a method of stretching using a tenter and a method of stretching by inflating in a tube-like shape.

The stretching temperature is preferably 90 to 300° C. and particularly preferably 105 to 250° C., because unevenness in thickness hardly occurs and an optical film having excellent mechanical characteristics and optical characteristics can be obtained.

The stretching ratio of film (hereinafter, referred to as "stretching ratio") is preferably 1.05 to 4.0 times, more preferably 1.05 to 3.5 times, and particularly preferably 1.1 to 3.0 times, because the resultant optical film is a thin film and exhibits good retardance.

The thickness of the film to be subjected to the stretching step is preferably 5 to 200 μm, more preferably 5 to 150 μm, and particularly preferably 5 to 100 μm from the viewpoints of easiness of stretching and adaptability of the optical film to thinner film.

By adjusting the stretching temperature and stretching ratio in this manner, the in-plane retardation of the obtained optical film can be controlled.

Conveying speed of the film in the stretching step is preferably in the range of 0.5 to 30 m/min and more preferably in the range of 1 to 20 m/min from the viewpoints of mechanical accuracy, stability, and the like.

The present disclosure may include a shrinkage step of performing a shrinkage treatment on the obtained optical film after stretching. Specifically, the stretched optical film is shrunk in a direction opposite to the stretching direction. Thus, residual stress accumulated in the stretched film can be alleviated, and the obtained optical film still exhibits a high retardation even after a long period of time.

The optical film may be further laminated with a film containing another resin, if necessary. Examples of the other resin include polyether sulfones, polyarylate, polyethylene terephthalate, polynaphthalene terephthalate, polycarbonates, cyclic polyolefins, maleimide-based resins, fluororesins, and polyimides. Alternatively, a liquid crystal layer, a hard coat layer, a gas barrier layer, and a layer with a controlled refractive index (a low reflection layer) may be laminated.

The optical film of the present disclosure is suitably used in retardation films to be used in applications such as liquid crystal display devices and organic EL display devices.

Further, by disposing the optical film of the present disclosure on at least one side of a polarizer, it is possible to obtain a polarizing plate having less retardation unevenness due to stress and excellent optical characteristics at the time of bending. The polarizing plate is suitably used in polarizing plates for liquid crystal displays and polarizing plates for preventing reflection.

The polarizer used in the polarizing plate of the present disclosure converts natural light or any polarized light into linearly polarized light. Any suitable polarizer may be employed depending on the purpose. Examples thereof include a film obtained by making a hydrophilic polymer film, such as a polyvinyl alcohol-based film, a partially formalized polyvinyl alcohol-based film, or a partially saponified film of an ethylene/vinyl acetate copolymer-based film adsorb a dichroic substance such as iodine or a dichroic dye, followed by uniaxial stretching, a polyene-based oriented film such as a dehydrated product of polyvinyl alcohol or a dehydrochlorination product of polyvinyl chloride. A guest-host type polarizer disclosed in U.S. Pat. No. 5,523,863, in which a liquid crystalline composition containing a dichroic substance and a liquid crystalline compound is oriented in a certain direction, an E-type polarizer disclosed in U.S. Pat. No. 6,049,428, in which a lyotropic liquid crystal is oriented in a certain direction, or the like also can be used.

EXAMPLES

Hereinafter, the present disclosure will be described with reference to Examples, but the present disclosure is not limited to these Examples.

The physical properties shown in the Examples were measured by the following methods.

<Analysis of Polymer (Resin)>

Structural analysis of polymers was obtained by proton nuclear magnetic resonance spectroscopy ($^1$H-NMR) spectrum analysis using a nuclear magnetic resonance analyzer (manufactured by JEOL, trade name: JNM-GX270).

<Measurement of Number Average Molecular Weight>

Measurement was performed at 40° C. using a gel permeation chromatography (GPC) apparatus (manufactured Tosoh, trade name: CO-8011 (equipped with column $GMH_{HR}$-H)) using tetrahydrofuran or dimethylformamide as a solvent to obtain a number average molecular weight as a standard polystyrene equivalent value.

<Measurement of Retardance (Rth, Re)>

The out-of-plane retardation Rth measured at a wavelength of 589 nm represented by the formula (a) and the in-plane retardation Re measured at a wavelength of 589 nm represented by the formula (b) were measured using a polarization retardation measuring system (manufactured by Axometrics, trade name: AxoScan).

<Measurement of Wavelength Dispersion Characteristics (R450/R550)>

The wavelength dispersion characteristics of the optical film were measured as a ratio (R450/R550) between the in-plane retardation Re(450) measured at a wavelength of 450 nm and the in-plane retardation Re(550) measured at a wavelength of 550 nm using a polarization retardation measuring system (manufactured by Axometrics, trade name: AxoScan).

<Measurement of Glass-Range Photoelastic Coefficient>

Using a polarizing retardation measuring system (manufactured by Axometrics, trade name: AxoScan) and a sample pulling jig, a film width of the measurement portion was adjusted to 15 mm. When the film thickness was 47 to 53 μm, the tensile weight of the film was varied between 4 and 13 N, and changes in the in-plane retardation (Re) of the film were measured using light with a wavelength of 589 nm. When the film thickness was 20 to 30 μm, the tensile weight of the film was varied between 4 and 9 N, and changes in the in-plane retardation (Re) of the film were measured using light with a wavelength of 589 nm. Then, the glass-range photoelastic coefficient was obtained from the following equation.

$$\text{Glass-range photoelastic coefficient}=\Delta Re/(\Delta\sigma\times d)$$

$\Delta\sigma$ is an amount of change in tensile weight applied to the film (unit: Pa), d is the film thickness (unit: m), and $\Delta Re$ is an amount of change in the in-plane retardation value (unit: m) corresponding to an amount of change in stress of $\Delta\sigma$.

<Measurement of Haze>

Haze was measured according to JIS-K 7136 using a spectroscopic haze meter (manufactured by Nippon Denshoku Industries, trade name: SH7000).

<Measurement of Light Transmission>

The light transmittance was measured in accordance with JIS-K 7361 using a spectroscopic haze meter (manufactured by Nippon Denshoku Industries, trade name: SH7000).

<Thickness Measurement>

The film thickness was measured using a high resolution linear gauge sensor (manufactured by Ono Sokki, trade name: GS-3813B).

Synthesis Example 1

In a 1-liter reactor equipped with a stirrer, a cooling tube, a nitrogen introduction tube, and a thermometer, 600 g of distilled water, 3.4 g of hydroxypropylmethylcellulose (trade name: METOLOSE 60SH-50, manufactured by Shin-Etsu Chemical) as a dispersant, 400.0 g of diisopropyl fumarate, and 8.3 g of t-butyl peroxypivalate as an oil-soluble radical initiator were placed, and after performing nitrogen bubbling for 1 hour, radical suspension polymerization was carried out by holding the temperature at 50° C. for 24 hours while stirring at 400 rpm. After completion of the polymerization reaction, the contents were collected from the reactor and the polymer was filtered off, washed twice with distilled water and twice with methanol, and dried under reduced pressure at 80° C. (yield: 77%). The number average molecular weight of the obtained diisopropyl fumarate polymer was 129,000.

Synthesis Example 2

In a 1-liter reactor equipped with a stirrer, a cooling tube, a nitrogen introduction tube, and a thermometer, 600 g of distilled water, 3.4 g of hydroxypropylmethylcellulose (trade name: METOLOSE 60SH-50, manufactured by Shin-Etsu Chemical) as a dispersant, 387.5 g of diisopropyl fumarate, 12.5 g of 3-ethyl-3-oxetanylmethyl acrylate (3.2 parts by weight per 100 parts by weight of diisopropyl fumarate) and 8.3 g of t-butyl peroxypivalate as an oil-soluble radical initiator were placed, and after performing nitrogen bubbling for 1 hour, radical suspension polymerization was carried out by holding the temperature at 50° C. for 24 hours while stirring at 400 rpm. After completion of the polymerization reaction, the contents were collected from the reactor and the polymer was filtered off, washed twice with distilled water and twice with methanol, and dried under reduced pressure at 80° C. (yield: 73%). The number average molecular weight of the obtained fumaric acid ester-based polymer was 147,000. By 1H-NMR measurement, the product was confirmed to be a diisopropyl fumarate/3-ethyl-3-oxetanylmethyl acrylate copolymer having a diisopropyl fumarate residue unit/3-ethyl-3-oxetanylmethyl acrylate residue unit=96.1/3.9 (mol %).

Synthesis Example 3

In a 1-liter reactor equipped with a stirrer, a cooling tube, a nitrogen introduction tube, and a thermometer, 600 g of distilled water, 3.4 g of hydroxypropylmethylcellulose (trade name: METOLOSE 60SH-50, manufactured by Shin-Etsu Chemical) as a dispersant, 350.9 g of diisopropyl fumarate, 49.1 g of diethyl fumarate (14.0 parts by weight per 100 parts by weight of diisopropyl fumarate) and 8.3 g of t-butyl peroxypivalate as an oil-soluble radical initiator were placed, and after performing nitrogen bubbling for 1 hour, radical suspension polymerization was carried out by holding the temperature at 50° C. for 28 hours while stirring at 400 rpm. After completion of the polymerization reaction, the contents were collected from the reactor and the polymer was filtered off, washed twice with distilled water and twice with methanol, and dried under reduced pressure at 80° C. (yield: 75%).

The number average molecular weight of the obtained fumaric acid ester-based polymer was 138,000. By $^1$H-NMR measurement, the product was confirmed to be a diisopropyl fumarate/diethyl fumarate copolymer having a diisopropyl fumarate residue unit/diethyl fumarate residue unit=86.7/13.3 (mol %).

Example 1

19.6 g of the fumaric acid ester-based resin obtained in Synthesis Example 1 and 0.4 g of 2,2'-methylenebis[6-

(benzotriazol-2-yl)-4-t-octylphenol] (molecular weight: 659) were dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film with a film thickness of 50 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 2

18.8 g of the fumaric acid ester-based resin obtained in Synthesis Example 2 and 1.2 g of 2,6-diphenyl-4-(2-hydroxy-4-hexyloxyphenyl)-1,3,5-triazine (molecular weight: 426) were dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film with a film thickness of 52 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 3

19.2 g of the fumaric acid ester-based resin obtained in Synthesis Example 2 and 0.8 g of 2,4-bis(2,4-dimethylphenyl)-6-(2-hydroxy-4-n-octyloxyphenyl)-1,3,5-triazine (molecular weight: 510) were dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film with a film thickness of 48 μm. The film thickness, the glass-range photoelastic coefficient, the retardance, the light transmittance, and the haze of the obtained film were measured. The results are also shown in Table 1. The obtained film was excellent in the glass-range photoelastic coefficient and was suitable as an optical film.

Example 4

19.6 g of the fumaric acid ester-based resin obtained in Synthesis Example 2 and 0.4 g of 4-cyano-4"-pentyl-p-terphenyl (molecular weight: 325) were dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film with a film thickness of 47 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 5

19.4 g of the fumaric acid ester-based resin obtained in Synthesis Example 2 and 0.6 g of 4-cyano-4"-pentyl-p-terphenyl (molecular weight: 325) were dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film with a film thickness of 47 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 6

19.2 g of the fumaric acid ester-based resin obtained in Synthesis Example 2 and 0.8 g of 4-cyano-4"-pentyl-p-terphenyl (molecular weight: 325) were dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film with a film thickness of 47 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 7

19.4 g of the fumaric acid ester-based resin obtained in Synthesis Example 3 and 0.6 g of 4-cyano-4"-propyl-p-terphenyl (molecular weight: 297) were dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in three stages at a drying temperature of 60° C., 120° C. and 140° C. to form a film with a film thickness of 26 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 8

18.8 g of the fumaric acid ester-based resin obtained in Synthesis Example 2 and 1.2 g of 2-(2H-benzotriazol-2-yl)-4,6-bis(1-methyl-1-phenylethyl)phenol (molecular weight: 448) were dissolved in a toluene/methyl ethyl ketone=4/6 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film with a film thickness of 49 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 9

18.8 g of the fumaric acid ester-based resin obtained in Synthesis Example 3 and 1.2 g of 2-(2H-benzotriazol-2-yl)-4,6-bis(1-methyl-1-phenylethyl)phenol (molecular weight: 448) were dissolved in a methyl ethyl ketone solution to obtain an 18 wt % resin solution. The solution was cast on a polyethylene terephthalate substrate (Lumirror T60 manufactured by Toray) by a coater and dried in three stages at a drying temperature of 60° C., 120° C., and 140° C. to form a film with a film thickness of 52 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 10

18.4 g of the fumaric acid ester-based resin obtained in Synthesis Example 3 and 1.6 g of 2-(2H-benzotriazol-2-yl)-4,6-bis(1-methyl-1-phenylethyl)phenol (molecular weight: 448) were dissolved in a methyl ethyl ketone solution to obtain an 18 wt % resin solution. The solution was cast on a polyethylene terephthalate substrate (Lumirror T60 manufactured by Toray) by a coater and dried in three stages at a drying temperature of 60° C., 120° C., and 140° C. to form a film with a film thickness of 50 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 11

18.8 g of the fumaric acid ester-based resin obtained in Synthesis Example 2 and 1.2 g of 2-[2-hydroxy-3-(4,5,6,7-tetrahydro-1,3-dioxo-1H-isoindol-2-ylmethyl)-5-methylphenyl]-2H-benzotriazole (molecular weight: 389) were dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film having a film thickness of 24 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 12

18.4 g of the fumaric acid ester-based resin obtained in Synthesis Example 2 and 1.6 g of 2-[4-[(2-hydroxy-3-(2'-ethyl)hexyl)oxy]-2-hydroxyphenyl]-4,6-bis(2,4-dimethylphenyl)-1,3,5-triazine (molecular weight: 584) were dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film with a film thickness of 24 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 13

19.4 g of the fumaric acid ester-based resin obtained in Synthesis Example 2 and 0.6 g of 2,7-bis(9H-carbazol-9-yl)-9,9-dimethylfluorene (molecular weight: 525) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 26 μm. The film thickness, the glass-range photoelastic coefficient, the retardance, the light transmittance, and the haze of the obtained film were measured. The results are collectively shown in Table 1. The obtained film was excellent in the glass-range photoelastic coefficient and was suitable as an optical film.

Example 14

19.4 g of the fumaric acid ester-based resin obtained in Synthesis Example 2 and 0.6 g of 9-(4-biphenylyl)carbazole (molecular weight: 319) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 25 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 15

19.4 g of the fumaric acid ester-based resin obtained in Synthesis Example 2 and 0.6 g of 1,3-di-9-carbazolylbenzene (molecular weight: 409) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 25 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 16

19.4 g of the fumaric acid ester-based resin obtained in Synthesis Example 2 and 0.6 g of 3,6-diphenylcarbazole (molecular weight: 319) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 27 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 17

19.4 g of the fumaric acid ester-based resin obtained in Synthesis Example 2 and 0.6 g of 9-phenyl-9H,9'H-2,3'-bicarbazole (molecular weight: 409) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 27 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 18

19.2 g of the fumaric acid ester-based resin obtained in Synthesis Example 2 and 0.8 g of 4,4"-dimethyl-5'-(p-tolyl)-1,1':3',1"-terphenyl (molecular weight: 348) were dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film with a film thickness of 26 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 19

18.8 g of the fumaric acid ester-based resin obtained in Synthesis Example 2 and 1.2 g of 2,2'-dimethoxy-1,1'-binaphthyl (molecular weight: 314) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 25 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 20

18.8 g of the fumaric acid ester-based resin obtained in Synthesis Example 2 and 1.2 g of 2,2'-dimethyl-1,1'-binaphthyl (molecular weight: 282) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 25 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 21

19.4 g of the fumaric acid ester-based resin obtained in Synthesis Example 2 and 0.6 g of 2,5-di(1-naphthyl)-1,3,4-oxadiazole (molecular weight: 322) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 26 μm. The film thickness, the glass-range photoelastic coefficient, the retardance, the light transmittance, and the haze of the obtained film were measured. The results are also shown in Table 2. The obtained film was excellent in the glass-range photoelastic coefficient and was suitable as an optical film.

Example 22

19.4 g of the fumaric acid ester-based resin obtained in Synthesis Example 2 and 0.6 g of 2-(4-biphenylyl)amino-9,9-dimethylfluorene (molecular weight: 361) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 27 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 23

19.4 g of the fumaric acid ester-based resin obtained in Synthesis Example 2 and 0.6 g of 9,9'-bifluorene (molecular weight: 330) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 25 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 24

19.4 g of the fumaric acid ester-based resin obtained in Synthesis Example 2 and 0.6 g of 1,7'-dimethyl-2'-propyl-2,5'-bibenzimidazole (molecular weight: 304) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 21 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 25

19.4 g of the fumaric acid ester-based resin obtained in Synthesis Example 2 and 0.6 g of tris[4-(2-thienyl)phenyl] amine (molecular weight: 492) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 21 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 26

19.4 g of the fumaric acid ester-based resin obtained in Synthesis Example 2 and 0.6 g of 4-phenyldibenzothiophene (molecular weight: 260) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 26 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 27

19.4 g of the fumaric acid ester-based resin obtained in Synthesis Example 2 and 0.6 g of 2,3-diphenylquinoxaline (molecular weight: 282) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 26 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 28

19.4 g of the fumaric acid ester-based resin obtained in Synthesis Example 2 and 0.6 g of dinaphtho[2,1-b:1',2'-d] furan (molecular weight: 268) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 26 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 29

19.4 g of the fumaric acid ester-based resin obtained in Synthesis Example 2 and 0.6 g of 9,9"-diphenyl-9H,9'H, 9"H-3,3':6',3"-tercarbazole (molecular weight: 650) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 27 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 30

19.4 g of the fumaric acid ester-based resin obtained in Synthesis Example 2 and 0.6 g of 9,3':6',9"-tercarbazole (molecular weight: 498) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 26 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Example 31

19.4 g of the fumaric acid ester-based resin obtained in Synthesis Example 2 and 0.6 g of 9-phenyl-9H,9'H-3,3'-bicarbazole (molecular weight: 409) were dissolved in a tetrahydrofuran solution to obtain an 18 wt % resin solution. The solution was cast on a polyethylene terephthalate substrate (Lumirror T60 manufactured by Toray) by a coater and dried in two stages at a drying temperature of 50° C. and 130° C. to form a film with a film thickness of 25 μm. The film thickness, the glass-range photoelastic coefficient, the retardance, the light transmittance, and the haze of the obtained film were measured. The results are collectively shown in Table 2. The obtained film was excellent in the glass-range photoelastic coefficient and was suitable as an optical film.

Comparative Example 1

20.0 g of the fumaric acid ester-based resin obtained in Synthesis Example 1 was dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film with a film thickness of 51 μm. The film thickness, the glass-range photoelastic coefficient, the retardance, the light transmittance, and the haze of the obtained film were measured. The results are collectively shown in Table 2. The obtained film did not contain a photoelasticity regulator, had a large absolute value of the glass-range photoelastic coefficient, and did not have the desired optical characteristics.

Comparative Example 2

20.0 g of the fumaric acid ester-based resin obtained in Synthesis Example 2 was dissolved in a toluene/methyl ethyl ketone=9/1 (weight ratio) solution to obtain an 18 wt % resin solution. The solution was cast on a polyethylene terephthalate substrate (Lumirror T60 manufactured by Toray) by a coater and dried in two stages at a drying temperature of 80° C. and 130° C. to form a film with a film thickness of 48 μm. The film thickness, the glass-range photoelastic coefficient, the retardance, the light transmittance, and the haze of the obtained film were measured. The results are collectively shown in Table 2. The obtained film did not contain a photoelasticity regulator, had a large absolute value of the glass-range photoelastic coefficient, and did not have the desired optical characteristics.

Comparative Example 3

20.0 g of the fumaric acid ester-based resin obtained in Synthesis Example 3 was dissolved in a methyl ethyl ketone solution to obtain an 18 wt % resin solution. The solution was cast on a polyethylene terephthalate substrate (manufactured by Lumirror T60 Toray) by a coater and dried in three stages at a drying temperature of 60° C., 120° C., and 140° C. to form a film having a film thickness of 53 μm. The film thickness, the glass-range photoelastic coefficient, the retardance, the light transmittance, and the haze of the obtained film were measured. The results are collectively shown in Table 2. The obtained film did not contain a photoelasticity regulator, had a large absolute value of the glass-range photoelastic coefficient, and did not have the desired optical characteristics.

Comparative Example 4

19.2 g of the fumaric acid ester-based resin obtained in Synthesis Example 3 and 0.8 g of diisodecyl adipate (molecular weight: 427) as a plasticizer were dissolved in a methyl ethyl ketone solution to obtain an 18 wt % resin solution. The solution was cast on a polyethylene terephthalate substrate (manufactured by Lumirror T60 Toray) by a coater and dried in three stages at a drying temperature of 60° C., 120° C., and 140° C. to form a film with a film thickness of 53 μm. The film thickness, the glass-range photoelastic coefficient, the retardance, the light transmittance, and the haze of the obtained film were measured. The results are collectively shown in Table 2. The obtained film contained a plasticizer, did not contain a photoelasticity regulator, had a large absolute value of the glass-range photoelastic coefficient, and did not have the desired optical characteristics.

Example 32

The film obtained in Example 3 was longitudinally uniaxially stretched to 1.2 times at 120° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 33

The film obtained in Example 4 was longitudinally uniaxially stretched by 2.0 times at 124° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 34

The film obtained in Example 5 was longitudinally uniaxially stretched by 2.0 times at 110° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 35

The film obtained in Example 6 was longitudinally uniaxially stretched by 1.3 times at 102° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 36

The film obtained in Example 7 was longitudinally uniaxially stretched by 2.0 times at 119° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 37

The film obtained in Example 10 was longitudinally uniaxially stretched by 1.2 times at 96° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 38

The film obtained in Example 13 was longitudinally uniaxially stretched by 1.4 times at 131° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 39

The film obtained in Example 14 was longitudinally uniaxially stretched by 1.4 times at 125° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 40

The film obtained in Example 15 was longitudinally uniaxially stretched by 1.4 times at 129° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 41

The film obtained in Example 16 was longitudinally uniaxially stretched by 1.4 times at 131° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 42

The film obtained in Example 17 was longitudinally uniaxially stretched by 1.4 times at 136° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 43

The film obtained in Example 18 was longitudinally uniaxially stretched by 1.4 times at 114° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 44

The film obtained in Example 21 was longitudinally uniaxially stretched by 1.4 times at 129° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 45

The film obtained in Example 22 was longitudinally uniaxially stretched by 1.4 times at 124° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 46

The film obtained in Example 24 was longitudinally uniaxially stretched by 1.4 times at 137° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 47

The film obtained in Example 25 was longitudinally uniaxially stretched by 1.4 times at 138° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 48

The film obtained in Example 26 was longitudinally uniaxially stretched by 1.4 times at 132° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics and the wavelength dispersion characteristics and was suitable as an optical film.

Example 49

The film obtained in Example 29 was longitudinally uniaxially stretched by 1.4 times at 140° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics, the wavelength dispersion characteristics, the light transmittance, and the haze and was suitable as an optical film.

Example 50

The film obtained in Example 30 was longitudinally uniaxially stretched by 1.4 times at 143° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics, the wavelength dispersion characteristics, the light transmittance, and the haze and was suitable as an optical film.

Example 51

The film obtained in Example 31 was longitudinally uniaxially stretched by 1.4 times at 139° C. using a batch type film biaxial stretching apparatus. The film thickness, the retardance, the wavelength dispersion characteristics, the light transmittance, and the haze of the obtained film were measured. The results are collectively shown in Table 3. The obtained film was excellent in the viewing angle characteristics, the wavelength dispersion characteristics, the light transmittance, and the haze and was suitable as an optical film.

Example 52

0.5 g of each of the photoelasticity regulators used in Examples 1 to 31 was added to 100 g of the tetrahydrofuran solvent and was left to stand at 25° C. for 24 hours, whereby each photoelasticity regulator dissolved in the tetrahydrofuran solvent. Since the photoelasticity regulators of Examples 1 to 31 had high solubility in the tetrahydrofuran solvent, the regulators are highly compatible with a resin, and films having excellent transparency were obtained.

Example 53

When 230 g of the photoelasticity regulator used in Example 20 was added to 100 g of tetrahydrofuran solvent and was left to stand at 25° C. for 24 hours, the photoelasticity regulator dissolved in the tetrahydrofuran solvent. Since the photoelasticity regulator of Example 20 had a high solubility in the tetrahydrofuran solvent, the regulator is highly compatible with a resin, and a film having excellent transparency was obtained.

TABLE 1

| | Composition | | | | Optical film | | | | |
|---|---|---|---|---|---|---|---|---|---|
| | Resin Composition | | Photoelasticity regulator | | Film | Glass-range | | Light | |
| | Type | % by weight | Type | % by weight | thickness (μm) | photoelastic coefficient (× $10^{-12}Pa^{-1}$) | Rth (nm) | transmittance (%) | Haze (%) |
| Example 1 | Synthesis Example 1 | 98 | 2,2'-methylenebis(6-(benzotriazol-2-yl)-4-t-octylphenol) | 2 | 50 | 4.5 | −189 | 93 | 0.4 |
| Example 2 | Synthesis Example 2 | 94 | 2,6-diphenyl-4-(2-hydroxy-4-hexyloxyphenyl-1,3,5-triazine | 6 | 52 | 0.6 | −156 | 93 | 0.6 |
| Example 3 | Synthesis Example 3 | 96 | 2,4-bis(2,4-dimethylphenyl)-6-(2-hydroxy-4-n-octyloxyphenyl)-1,3,5-triazine | 4 | 48 | 3.5 | −165 | 93 | 0.4 |
| Example 4 | Synthesis Example 4 | 98 | 4-cyano-4''-pentyl-p-terphenyl | 2 | 47 | 4.1 | −147 | 93 | 0.3 |
| Example 5 | Synthesis Example 5 | 97 | 4-cyano-4''-pently-p-terphenyl | 3 | 47 | 2.7 | −126 | 93 | 0.3 |
| Example 6 | Synthesis Example 6 | 96 | 4-cyano-4''-propyl-p-terphenyl | 4 | 47 | 1.9 | −100 | 93 | 0.3 |
| Example 7 | Synthesis Example 7 | 97 | 4-cyano-4''-propyl-p-terphenyl | 3 | 26 | 3.7 | −73 | 93 | 0.2 |
| Example 8 | Synthesis Example 8 | 94 | 2-(2H-benzotriazol-2-yl)-4,6-bis(1-methyl-1-phenylethyl)phenol | 6 | 49 | 2.0 | −174 | 93 | 0.4 |
| Example 9 | Synthesis Example 9 | 94 | 2-(2H-benzotriazol-2-yl)-4,6-bis(1-methyl-1-phenylethyl)phenol | 6 | 52 | 1.5 | −220 | 93 | 0.3 |
| Example 10 | Synthesis Example 10 | 92 | 7-(7N-berizotriazol-2-yl)-4,6-bis (1-methyl-1-phenylethyl) phenol | 8 | 50 | −0.8 | −208 | 93 | 0.3 |
| Example 11 | Synthesis Example 11 | 94 | 2-[2-hydroxy-3-(4,5,6,7-tetrahydro-1,3-dioxo-1H-isoindol-2-ylmethyl)-5-methylphenyl]-2H-benzotriazole | 6 | 24 | 3.1 | -82 | 93 | 0.1 |
| Example 12 | Synthesis Example 12 | 92 | 2-(4-[(2-hydroxy-3-(2'-ethyl)hexyl) oxy]-2-hydroxyphenyl]-4, 6-bis(2,4-dimethylphenyl)-1,3,5-triazine | 8 | 24 | 3.4 | −75 | 93 | 0.5 |
| Example 13 | Synthesis Example 13 | 97 | 2,7-bis (9H-carbazol-9-yl)-9,9-dimethylfluorine | 3 | 26 | 2.6 | −77 | 93 | 0.4 |

TABLE 2

| | Composition | | | | Optical film | | | | |
|---|---|---|---|---|---|---|---|---|---|
| | Resin composition | | Photoelasticity regulator | | Film | Glass-range photoelastic | | Light | |
| | Type | & by weight | Type | % by weight | thickness (μm) | coefficient ($\times 10^{-12}Pa^{-1}$) | Rth (nm) | transmittance (%) | Haze % |
| Example 14 | Synthesis Example 2 | 97 | 9-(4-bisphenylyl)carbazole | 3 | 25 | 3.0 | −80 | 93 | 0.3 |
| Example 15 | Synthesis Example 2 | 97 | 1,3-di-9-carbazolylbenzene | 3 | 25 | 2.8 | −83 | 93 | 0.2 |
| Example 16 | Synthesis Example 2 | 97 | 3,6-diphenylcarbazole | 3 | 27 | 2.1 | −72 | 93 | 0.3 |
| Example 17 | Synthesis Example 2 | 97 | 9-phenyl-9H,9'H-2,3'-bicarbazole | 3 | 27 | 1.2 | −65 | 93 | 0.2 |
| Example 18 | Synthesis Example 2 | 96 | 4,4"-dimethyl-5'-(p-tolyl)-1,1':3',1"-terphenyl | 4 | 26 | 2.3 | −81 | 93 | 0.2 |
| Example 19 | Synthesis Example 2 | 94 | 2,2'-dimeethoxy-1,1'-binaphthyl | 6 | 25 | 1.4 | −89 | 93 | 0.2 |
| Example 20 | Synthesis Example 2 | 94 | 2,2'-dimeethyl-1,1'-binaphthyl | 6 | 25 | 3.1 | −87 | 93 | 0.1 |
| Example 21 | Synthesis Example 2 | 97 | 2,5-di(1-naphthyl)-1,3,4-oxadiazole | 3 | 26 | 3.1 | −77 | 93 | 0.3 |
| Example 22 | Synthesis Example 2 | 97 | 2-(4-biphenylyl)amino-9,9'-dimethylfluorene | 3 | 27 | 0.9 | −71 | 93 | 0.3 |
| Example 23 | Synthesis Example 2 | 97 | 9,8'-bifluerene | 3 | 25 | 3.4 | −81 | 93 | 0.4 |
| Example 24 | Synthesis Example 2 | 97 | 1,7'dimethyl-2'-propyl-2,5'-bibenzimidazole | 3 | 21 | 3.8 | −63 | 93 | 0.5 |
| Example 25 | Synthesis Example 2 | 97 | Tri[4-(2-thienyl)phenyl]amine | 3 | 21 | 2.6 | −62 | 93 | 0.6 |
| Example 26 | Synthesis Example 2 | 97 | 4-phenyldibenzothiphene | 3 | 26 | 3.9 | −79 | 93 | 0.3 |
| Example 27 | Synthesis Example 2 | 97 | 2,3-diphenylquinoxaline | 3 | 26 | 4.0 | −86 | 93 | 0.2 |
| Example 28 | Synthesis Example 2 | 97 | Dinaptho[2,1-b:1',2'-d]furan | 3 | 26 | 2.6 | −82 | 93 | 0.2 |
| Example 29 | Synthesis Example 2 | 97 | 9,9"-diphenyl-9H,9'H,9"H-3,3':6',3"-tercarbazole | 3 | 27 | 2.1 | −74 | 93 | 0.4 |
| Example 30 | Synthesis Example 2 | 97 | 9,3':6',9"-tercarbazole | 3 | 26 | 2.3 | −79 | 93 | 0.4 |
| Example 31 | Synthesis Example 2 | 97 | 9-phenyl-9H,9'H-3,3'-bicarbazole | 3 | 25 | 2.3 | −64 | 93 | 0.3 |
| Comparative Example 1 | Synthesis Example 1 | 100 | Not added | — | 51 | 6.5 | −198 | 93 | 0.4 |
| Comparative Example 2 | Synthesis Example 2 | 100 | Not added | — | 48 | 6.3 | −186 | 93 | 0.3 |
| Comparative Example 3 | Synthesis Example 3 | 100 | Not added | — | 53 | 6.6 | −238 | 93 | 0.4 |
| Comparative Example 4 | Synthesis Example 3 | 96 | Diisodecyl adipate | 4 | 53 | 6.2 | −239 | 93 | 0.4 |

TABLE 3

| | | Stretched film | | | | | | |
|---|---|---|---|---|---|---|---|---|
| | Original film | Stretch ratio | Film thickness (μm) | Re (nm) | Rth (nm) | $R_{450}/R_{550}$ | Light transmittance (%) | Haze (%) |
| Example 32 | Example 3 | 1.20 | 45 | 187 | −174 | 1.001 | 93 | 0.5 |
| Example 33 | Example 4 | 2.00 | 34 | 284 | −149 | 0.955 | 93 | 0.3 |
| Example 34 | Example 5 | 2.00 | 34 | 215 | −116 | 0.873 | 93 | 0.3 |
| Example 35 | Example 6 | 1.30 | 40 | 136 | −91 | 0.833 | 93 | 0.3 |
| Example 36 | Example 7 | 2.00 | 19 | 132 | −71 | 0.857 | 93 | 0.3 |
| Example 37 | Example 10 | 1.20 | 49 | 245 | −117 | 1.007 | 93 | 0.3 |
| Example 38 | Example 13 | 1.40 | 22 | 129 | −85 | 0.988 | 93 | 0.3 |
| Example 39 | Example 14 | 1.40 | 21 | 135 | −92 | 1.011 | 93 | 0.3 |
| Example 40 | Example 15 | 1.40 | 21 | 137 | −93 | 1.015 | 93 | 0.2 |
| Example 41 | Example 16 | 1.40 | 24 | 113 | −77 | 0.948 | 93 | 0.3 |
| Example 42 | Example 17 | 1.40 | 23 | 105 | −66 | 0.902 | 93 | 0.3 |
| Example 43 | Example 18 | 1.40 | 22 | 131 | −84 | 1.009 | 93 | 0.2 |
| Example 44 | Example 21 | 1.40 | 21 | 131 | −86 | 0.982 | 93 | 0.2 |
| Example 45 | Example 22 | 1.40 | 22 | 112 | −76 | 0.892 | 93 | 0.5 |
| Example 46 | Example 24 | 1.40 | 18 | 109 | −69 | 1.002 | 93 | 0.3 |
| Example 47 | Example 25 | 1.40 | 17 | 131 | −70 | 0.985 | 93 | 0.5 |

TABLE 3-continued

| | Original film | Stretched film | | | | | | |
|---|---|---|---|---|---|---|---|---|
| | | Stretch ratio | Film thickness (μm) | Re (nm) | Rth (nm) | $R_{450}/R_{550}$ | Light transmittance (%) | Haze (%) |
| Example 48 | Example 26 | 1.40 | 22 | 136 | −95 | 1.014 | 93 | 0.3 |
| Example 49 | Example 29 | 1.40 | 23 | 123 | −84 | 0.967 | 93 | 0.5 |
| Example 50 | Example 30 | 1.40 | 22 | 140 | −91 | 3.009 | 93 | 0.3 |
| Example 51 | Example 31 | 1.40 | 22 | 106 | −70 | 0.943 | 93 | 0.2 |

The invention claimed is:

1. An optical film comprising an ester-based resin comprising at least 50 mol % of a fumaric acid ester residue unit represented by the following formula (1) and exhibiting negative birefringence and a photoelasticity regulator exhibiting positive birefringence, wherein the optical film has an absolute value of a glass-range photoelastic coefficient of $5\times10^{-12}$ $Pa^{-1}$ or less:

(1)

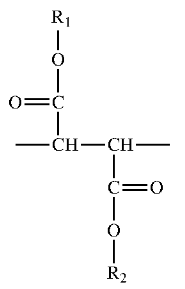

wherein $R_1$ and $R_2$ each independently represent a linear alkyl group having 1 to 12 carbon atoms, a branched alkyl group having 3 to 12 carbon atoms, or a cyclic alkyl group having 3 to 6 carbon atoms.

2. The optical film according to claim 1, comprising from 81% to 99.99% by weight of the ester-based resin and from 0.01% to 19% by weight of the photoelasticity regulator.

3. The optical film according to claim 1, wherein the photoelasticity regulator is an aromatic compound.

4. The optical film according to claim 1, wherein the photoelasticity regulator is at least one type selected from the group consisting of a ultraviolet absorbent and a liquid crystal material.

5. The optical film according to claim 1, wherein the photoelasticity regulator is at least one type selected from the group consisting of a benzotriazole-based compound, benzophenone-based compound, benzoimidazole-based compound, triazine-based compound, benzoate-based compound, biphenyl-based compound, terphenyl-based compound, naphthalene-based compound, quinoxaline-based compound, thiophene-based compound, fluorene-based compound, and carbazole-based compound.

6. The optical film according to claim 1, wherein the photoelasticity regulator is at least one type selected from the group consisting of benzotriazole-based compound, triazine-based compound, biphenyl-based compound, terphenyl-based compound, naphthalene-based compound having at least two naphthalene rings, thiophene-based compound having at least two thiophene rings, fluorene-based compound having a substituent comprising at least one selected from the group consisting of 5-membered ring, 6-membered ring, and a fused ring at one or more positions selected from the group consisting of 2-, 3-, 6-, 7-, and 9-position of the fluorene ring, and carbazole-based compound having a substituent comprising at least one selected from the group consisting of 5-membered ring, 6-membered ring, and a fused ring at one or more positions selected from the group consisting of 2-, 3-, 6-, 7-, and 9-position of the carbazole ring.

7. The optical film according to claim 1, wherein the photoelasticity regulator has a solubility in a tetrahydrofuran solvent at 25° C. of at least 0.2 g/100 g.

8. The optical film according to claim 1, wherein the ester-based resin has a number average molecular weight of from 100,000 to 5,000,000 in terms of standard polystyrene.

9. The optical film according to claim 1, wherein the optical film has a film thickness of 80 μm or less and an out-of-plane retardation (Rth) measured at a wavelength of 589 nm and represented by the following formula (a) of from −700 nm to 0 nm:

$$Rth=[(nx+ny)/2-nz]\times d, \tag{a}$$

wherein nx represents a refractive index in the fast axis direction in the film plane, ny represents a refractive index in the slow axis direction in the film plane, nz represents a refractive index in a vertical direction outside the film plane, and d represents a film thickness.

10. The optical film according to claim 1, wherein the optical film has a light transmittance of at least 85% and a haze of 1% or less.

11. An optical film obtained by stretching the optical film of claim 1, wherein the optical film has a film thickness of 80 μm or less, an in-plane retardation Re measured at a wavelength of 589 nm and represented by the following formula (b) of from 30 nm to 400 nm, and ratio R450/R550 of an in-plane retardation Re (R450) measured at a wavelength of 450 nm and an in-plane retardation Re (R550) measured at a wavelength of 550 nm of less than 1.03:

$$\mathrm{Re}=(ny-nx)\times d, \tag{b}$$

wherein nx represents a refractive index in the fast axis direction in the film plane, ny represents a refractive index in the slow axis direction in the film plane, and d represents a film thickness.

12. A polarizing plate, comprising the optical film of claim 1 disposed on at least one side of a polarizer.

* * * * *